US010536458B2

(12) United States Patent
Qu et al.

(10) Patent No.: US 10,536,458 B2
(45) Date of Patent: Jan. 14, 2020

(54) METHOD AND APPARATUS FOR MANAGING A TRANSACTION RIGHT

(71) Applicant: KONINKLIJKE PHILIPS N.V., Eindhoven (NL)

(72) Inventors: Jin Qu, Shanghai (CN); Fulong Ma, Eindhoven (NL); Xin Ge, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 285 days.

(21) Appl. No.: 14/438,908

(22) PCT Filed: Nov. 1, 2013

(86) PCT No.: PCT/IB2013/059835
§ 371 (c)(1),
(2) Date: Apr. 28, 2015

(87) PCT Pub. No.: WO2014/076604
PCT Pub. Date: May 22, 2014

(65) Prior Publication Data
US 2015/0341360 A1 Nov. 26, 2015

(30) Foreign Application Priority Data
Nov. 13, 2012 (WO) ................ PCT/CN2012/084501

(51) Int. Cl.
*G06F 21/10* (2013.01)
*H04L 29/06* (2006.01)

(52) U.S. Cl.
CPC .............. *H04L 63/10* (2013.01); *H04L 63/20* (2013.01)

(58) Field of Classification Search
CPC .......... G06F 21/10; G06F 21/62; G06F 21/00; G06F 2221/2137; G06F 2221/2145;
(Continued)

(56) References Cited

U.S. PATENT DOCUMENTS 5,917,912 A 6/1999 Ginter et al.
7,711,678 B2 5/2010 Zhang et al.
(Continued)

FOREIGN PATENT DOCUMENTS

CN 1249041 A 3/2000
CN 101193079 A 6/2008
(Continued)

*Primary Examiner* — Brian F Shaw (57) ABSTRACT

This invention provides a method for managing a transaction right in a digital rights management server. The transaction right is the right to a transaction of a utilization right of a digital content item. The method comprises steps of obtaining an attribute associated with the digital content item from metadata of the digital content item; and generating the transaction right on the basis of a pre-stored rule and the attribute of the digital content item. Since the transaction right is generated on the basis of the attribute of the digital content item, or in other words, the transaction right is dependent on the attribute of the digital content item, the generated transaction right of digital content items can be different if the corresponding attribute associated with the digital content items are different. Furthermore, in additional to the metadata, the generation of the transaction right only requires the pre-stored rule, resulting in affordable complexity and cost. Since the transaction right is also dependent on the pre-stored rule, the content providers need not to individually set the transaction right for each digital content item, but are still able to set the transaction right by setting the pre-stored rule.

17 Claims, 3 Drawing Sheets

(58) Field of Classification Search
CPC .............. G06Q 20/1235; G06Q 30/00; G06Q
30/0601; G06Q 30/06; H04L 2463/101;
H04L 63/10; H04L 2209/60; H04N
21/8355; H04N 21/2407; H04N 21/2541;
H04N 21/44204
USPC ............ 705/51, 59; 726/26, 27, 31; 380/201
See application file for complete search history.

(56) References Cited

U.S. PATENT DOCUMENTS

| | | | |
|---|---|---|---|
| 8,826,036 B1* | 9/2014 | Snodgrass | G06F 21/10 370/235 |
| 2002/0112171 A1 | 8/2002 | Ginter et al. | |
| 2002/0198846 A1* | 12/2002 | Lao | G06F 21/10 705/54 |
| 2005/0021783 A1 | 1/2005 | Ishii | |
| 2006/0010075 A1 | 1/2006 | Wolf | |
| 2007/0219917 A1 | 9/2007 | Liu et al. | |
| 2008/0091462 A1* | 4/2008 | Lao | G06F 17/3089 705/344 |
| 2008/0109234 A1 | 5/2008 | Leach et al. | |
| 2011/0231273 A1 | 9/2011 | Buchheit | |
| 2011/0302009 A1 | 12/2011 | Freed et al. | |
| 2012/0173353 A1* | 7/2012 | Rausch | G06Q 30/0601 705/26.1 |

FOREIGN PATENT DOCUMENTS

| | | |
|---|---|---|
| CN | 102414677 A | 4/2012 |
| CN | 102693378 A | 9/2012 |
| EP | 1927925 A2 | 6/2008 |
| JP | 2001167188 A | 6/2001 |
| JP | 2002074053 A | 3/2002 |
| JP | 2003174443 A | 6/2003 |
| JP | 2008010012 A | 1/2008 |
| WO | 9837481 A1 | 8/1998 |
| WO | 02101577 A1 | 12/2002 |
| WO | 2005093989 A1 | 10/2005 |
| WO | 2010123737 A2 | 10/2010 |

* cited by examiner

METHOD AND APPARATUS FOR MANAGING A TRANSACTION RIGHT

CROSS-REFERENCE TO PRIOR APPLICATIONS

This application is the U.S. National Phase application under 35 U.S.C. § 371 of International Application No. PCT/IB2013/059835, filed on Nov. 1, 2013, which claims the benefit of Patent Application No. PCT/CN2012/084501 filed on Nov. 13, 2012. These applications are hereby incorporated by reference herein.

FIELD OF THE INVENTION

The invention relates to digital rights management and, more particularly, to a method and apparatus for managing a transaction right.

BACKGROUND OF THE INVENTION

Nowadays, customers have been used to purchase and use e-books, music files, movie files and software files (generally referred to as digital content items hereinafter) in additional to the traditional counterparts such as paper books, CDs carrying music files, DVDs carrying movie files and Disks carrying software files. Furthermore, more and more customers have a need for reselling the digital content items purchased from content providers, just like they have been long permitted to resell the traditional counterparts.

The publication US 2011/0231273 A1 discloses a secondary market for previously sold digital media content. Each of the previously sold digital media content items can include a utilization right and a transfer right. The transfer right of a media content item grants a right to transfer ownership of the utilization right of the media content item to another. The transfer right can include multi lower level rights, such as different permission levels for this right, durations, restrictions, encoding, a right to reformat, a right to modify fidelity, a right to embody within specific tangible medium types (DVD, BluRay, flash memory, etc.), and the like.

In the publication US 2011/0231273 A1, a transfer right is introduced to define a right to resell a media content item, but there is no disclosure about the management of the transfer right.

SUMMARY OF THE INVENTION

The inventor of the present invention has recognized the following difficulties for resale of digital content items.

The resale of a digital content item is not realizable without a concrete solution for managing the right to resell the digital content item. The content provider may desire to place different restrictions on the resale for different digital content items or even for different utilization rights of the same digital content item granted to different users. Accordingly, the right to resell may be different for different digital content items or even for different utilization rights of the same digital content item. However, the number of the digital content items as well as the number of the utilization rights of each digital item is expected to be huge and increase continuously, and thus, individually setting and recording the right for each digital content item or even for each utilization right of the digital content item could require tremendous work and mass database.

Based on the understanding of the technical problems and prior art described above, it would be desirable to provide a solution for managing a right to resell a digital content item, such as creating and/or updating the rights. It would be also desirable to provide a mechanism for placing different right to resell for different digital item or even for different sold-out utilization rights of each digital content item with affordable complexity and cost.

To better address one or more of the above concerns, according to an embodiment of an aspect of the present invention, a method for managing a transaction right in a digital rights management server is provided. The transaction right is the right to a transaction of a utilization right of a digital content item. The method comprises steps of:

obtaining an attribute associated with the digital content item from metadata of the digital content item; and generating the transaction right on the basis of a pre-stored rule and the attribute of the digital content item.

Since the transaction right is generated on the basis of the attribute of the digital content item, or in other words, the transaction right is dependent on the attribute of the digital content item, the generated transaction right of digital content items can be different if the corresponding attribute associated with the digital content items are different. Furthermore, in additional to the metadata, the generation of the transaction right only requires the pre-stored rule, resulting in affordable complexity and cost. Since the transaction right is also dependent on the pre-stored rule, the content providers need not to individually set the transaction right for each digital content item, but are still able to set the transaction right by setting the pre-stored rule. Additionally, the metadata of the digital content item is widely used in digital rights management, and thus, the provided method can be integrated into almost all kinds of digital rights management system without difficulties.

The digital content item can refer to any digitalized content item suitable for electronic transaction, including e-books, photograph files, music files, movie files, software files etc. or a combination thereof. The digital content item is unnecessary to be carried by any tangible object, but can be downloaded via internet, for example.

A transaction of a utilization right of a digital content item includes both a first-hand transaction in which the seller is a content provider and the seller grants the purchaser the utilization right of the digital content item and a second-hand transaction in which the ownership of the utilization right is transferred from the seller to the purchaser.

In another embodiment, the attribute is associated with at least one of type, length, author, publishing date, publishing price, transaction times, utilization times, and ranking of the digital content item. Since the attribute can be various, the transaction right can be set in a very flexible way.

Accordingly, the attribute can either be static (e.g. author, publishing date) or time-varying (e.g. transaction times, utilization times).

In another embodiment, the method further comprises updating the attribute on the basis of transactions and/or utilizations of the digital content item.

In this way, the attribute of the digital content item can be dynamic in accordance with the transactions and/or utilizations of the digital content item, and thus, the transaction right generated based thereon can also be dynamic.

In another embodiment, the transaction right comprises one or more right entries, and each right entry indicates one of the following restrictions for the transaction of the utility right of the digital content item: restriction on transaction times, restriction on transaction frequency, restriction on transaction time, restriction on a geographic area of the transaction, and restriction on price of the transaction.

In this way, the transaction right can contain various restrictions to meet various demands of the content providers.

In another embodiment, the method further comprises a step of obtaining transaction information of at least one transaction of the utilization right of the digital content item; and the step of generating comprises generating the transaction right on the basis of the pre-stored rule, the attribute of the digital content item and the transaction information of the at least one transaction.

Since the generated transaction right is not only dependent on the attribute of the digital content item but also dependent on at least one transaction of the utilization right of the digital content item, the transaction right of a digital content item can be set differently for different utilization rights of the digital content item.

In another embodiment, the transaction information of the at least one transaction is recorded in a license for the utilization right.

Since the license for the utilization right can only be modified by the digital management server, the transaction information can be prevented from any malicious modification.

In another embodiment, the method further comprises:
obtaining the transaction right;
obtaining transaction information of at least one transaction of the utilization right of the digital content item; and
updating the transaction right on the basis of the transaction information of the at least one transaction and at least one of the attribute, the obtained transaction right, and the pre-stored rule.

In another embodiment, the transaction right of the utilization right is recorded in a license for the utilization right.

In another embodiment, the method further comprises steps of:
receiving a request for the transaction right before the step of obtaining the attribute, the request including the metadata of the digital content item; and
sending the transaction right after the step of generating the transaction right.

According to an embodiment of another aspect of the present invention, a first method for supporting a transaction of a utilization right of a digital content item is provided. A transaction right is the right to a transaction of the utilization right of the digital content item. The method comprising a step of:
sending a request for the transaction right to a digital rights management server, the request including the metadata of the digital content item, the metadata of the digital content item comprising an attribute associated with the digital content item;
wherein the transaction right is generated by the digital rights management server on the basis of a pre-stored rule and the attribute of the digital content item.

According to an embodiment of another aspect of the present invention, a second method for supporting a transaction of a utilization right of a digital content item is provided. A transaction right is the right to a transaction of the utilization right of the digital content item. The method comprises a step of:
receiving the transaction right from a digital rights management server, the transaction right being generated by a digital rights management server on the basis of a pre-stored rule and an attribute of the digital content item in metadata of the digital content item.

According to an embodiment of another aspect of the present invention, an apparatus in a digital rights management server for managing a transaction right is provided. The transaction right is the right to a transaction of a utilization right of a digital content item. The apparatus comprises:
an obtaining unit for obtaining an attribute associated with the digital content item from metadata of the digital content item; and
a generating unit for generating the transaction right on the basis of a pre-stored rule and the attribute of the digital content item.

According to an embodiment of another aspect of the present invention, an apparatus for supporting a transaction of a utilization right of a digital content item is provided. A transaction right is the right to a transaction of the utilization right of the digital content item. The apparatus comprises:
a sending unit for sending a request for the transaction right to a digital rights management server, the request including the metadata of the digital content item, the metadata of the digital content item comprising an attribute associated with the digital content item;
wherein the transaction right is generated by a digital rights management server on the basis of a pre-stored rule and the attribute of the digital content item.

According to an embodiment of another aspect of the present invention, an apparatus for supporting a transaction of a utilization right of a digital content item is provided. A transaction right is the right to a transaction of the utilization right of the digital content item. The apparatus comprises:
a receiving unit for receiving the transaction right, the transaction right being generated by a digital rights management server on the basis of a pre-stored rule and an attribute of the digital content item in metadata of the digital content item.

According to an embodiment of another aspect of the present invention, computer-executable instructions for managing a transaction right is provided. The transaction right is the right to a transaction of a utilization right of a digital content item. The computer-executable instructions are configured to perform the above-mentioned method for managing a transaction right in a digital rights management server.

According to an embodiment of another aspect of the present invention, computer-executable instructions for supporting a transaction of a utilization right of a digital content item is provided. A transaction right is a right to a transaction of the utilization right of the digital content item. The computer-executable instructions are configured to perform the above-mentioned first method for supporting a transaction of a utilization right of a digital content item.

According to an embodiment of another aspect of the present invention, computer-executable instructions for supporting a transaction of a utilization right of a digital content item is provided. A transaction right is a right to a transaction of the utilization right of the digital content item. The computer-executable instructions are configured to perform the above-mentioned second method for supporting a transaction of a utilization right of a digital content item.

These and other aspects of the invention will be apparent from and elucidated with reference to the embodiments described hereinafter.

DESCRIPTION OF THE DRAWINGS

The above and other objects and features of the present invention will become more apparent from the following detailed description considered in connection with the accompanying drawings, in which.

DETAILED DESCRIPTION

Detailed description of the present invention is given below in connection with the accompanying drawings.

Figure 1:
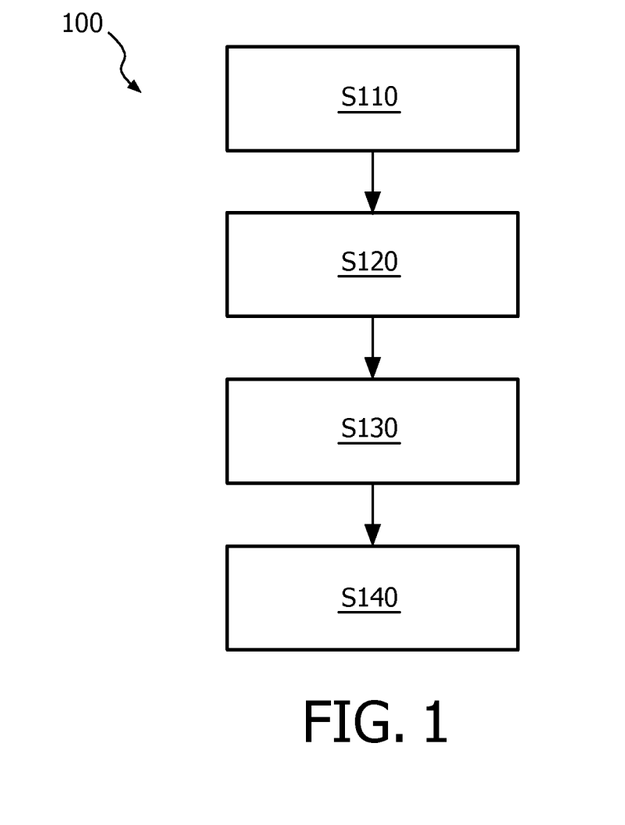
FIG. 1 depicts a flowchart of a method for managing a transaction right in accordance with an embodiment of the present invention.

FIG. 1 depicts a flowchart of a method 100 for managing a transaction right in accordance with an embodiment of the present invention.

According to an embodiment of the present invention, a method for managing a transaction right in a digital rights management server is provided.

The transaction right is the right to a transaction of a utilization right of a digital content item. The digital content item can refer to any digitalized content item suitable for electronic transaction, including e-books, photograph files, music files, movie files, software files etc. or a combination thereof. The digital content item is unnecessary to be carried by any tangible object, but can be downloaded via internet, for example. A transaction of a utilization right of a digital content item includes both a first-hand transaction in which the seller is a content provider and the seller grants the purchaser the utilization right of the digital content item and a second-hand transaction in which the ownership of the utilization right is transferred from the seller to the purchaser.

Referring to FIG. 1, the method 100 comprises a step S120 of obtaining an attribute associated with the digital content item from metadata of the digital content item.

The attribute associated with the digital content item may also be referred to as intrinsic attribute of the digital content item, considering that the attribute is associated with the digital content item and is the same for any utilization right of the digital content item.

In an embodiment, the attribute is associated with at least one of type, length, author, publishing date, publishing price, transaction times, utilization times, and ranking of the digital content item.

The type of the digital content item can be the classified in accordance with the content of the digital content item. For example, in case that the digital content item is e-book, the types of the digital content item can include textbook, academic paper, classic novel, popular novel, newspaper, etc.

The transaction times can be the number of first-hand transactions or the number of first-hand and second-hand transactions, and the transaction times can be the total transaction times so far or can be counted over a predetermined time period.

The ranking of the digital content item can be any ranking, for example, ranking in terms of popularity.

As it can be seen, the attribute can either be static (e.g. author, publishing date) or time-varying (e.g. transaction times, utilization times). In an embodiment, the method 100 can further comprise updating the attribute on the basis of transactions and/or utilizations of the digital content item. For example, the attribute associated with transaction times and/or utilization times shall be updated on the basis of transactions and/or utilizations of the digital content item. For another example, since the ranking of the digital content item can also be dependent on the transactions and/or utilization of the digital content item (e.g. more transactions, higher ranking), the attribute associated with ranking shall also be updated accordingly.

In an embodiment, a plurality of categories are defined for the digital content item according to at least one of type, length, author, publishing date, publishing price, transaction times, utilization times, and ranking of the digital content item, and the attribute of the digital content item includes the information indicating the category of the digital content item.

In general, the metadata of the digital content item comprises a plurality of fields. Accordingly, the intrinsic attribute of the digital content item can be one field of the metadata or a combination of two or more fields of the metadata.

The field of the metadata can be an existing field defined in the current standards, such as the author of the digital content item or the publishing date of the digital content item.

Alternatively, the field of the metadata can be a field newly defined for the purpose of transaction right management. For example, a field of transaction times can be defined and inserted in the metadata of the digital content item. For another example, a field of category can be defined and inserted in the metadata of the digital content item.

Further referring to FIG. 1, the method 100 further comprises a step S130 of generating the transaction right on the basis of a pre-stored rule and the attribute of the digital content item.

The step S130 can be performed for different purposes. When there is no transaction right bonding with a digital content item, the step S130 can be performed to create a transaction right for the digital content item. When there is a transaction right bonding with a digital content item, the step S130 can be performed to update the transaction right. For example, the transaction right can be updated when the pre-stored rule is changed and/or when the attribute of the digital content item is changed.

Each transaction right comprises one or more right entries, and each right entry indicates one of the following restrictions for the transaction of the utility right of the digital content item: restriction on transaction times, restriction on transaction frequency, restriction on transaction time, restriction on a geographic area of the transaction, and restriction on price of the transaction.

In an embodiment, each right entry can comprise two parts, the type and the value. The type of right entries can include but not limited to the maximum number of transactions in a life time, the maximum transaction frequency, no permission of transaction in a time period after publishing, no permission of transaction for a time period after last transaction, geographic restriction, the lowest price of transaction, and pages range for preview. For example, if the type of a right entry is the maximum number of transaction time in a life time and the value of the right entry is 3, the right entry indicates that the digital content item cannot be transacted more than 3 times; if the type of a right entry is no permission of transaction in a time period after publishing and the value is 1, the right entry indicates that no second transaction is permitted within 1 year after publishing; if the type of a right entry is geographic restriction and the value is China, the right entry indicates that the digital content item can only be transacted within China.

The pre-stored rule can be set by publishers. In an embodiment, a plurality of rules are pre-stored, each of which are set by a different publisher. Alternatively, the pre-stored rule can be determined by the publisher and the retailer together.

According to the pre-stored rule, different transaction rights can be defined according to the intrinsic attribute of the digital content item.

Taking e-book as an example, if an e-book belongs to popular periodicals, popular web novels etc. and thus its value reduce quickly with the time, the transaction right of the book may be defined as not permitted in a time period or transaction for a limited times for a period. If an e-book belongs to classical novel and thus its value is stable, the transaction right of the book may be defined as limited number of transaction times. If an e-book belongs to newspaper and thus its value of the book is perishable soon, the transaction right of the book may be defined as not permitted to be transacted in a short time period. If an e-book belongs to academic paper and thus its value may be stable, the transaction right may be defined as not permitted to be transacted. If an e-book belongs to textbook and thus its value may be stable but reduce quickly for a particular user, the transaction right may be defined as limited number of transaction times for a long period as well as not permitted to be transacted again in a certain period.

According to an embodiment, in the case that the intrinsic attribute of the digital content item includes the information indicating the category of the digital content item, the pre-stored rule can comprise a plurality of transaction rights with each corresponding to one of the plurality of categories.

Further referring to FIG. 1, the method 100 can further comprise a step S110 before the step S120, and a step S140 after the step S130. In the step S110, a request for the transaction right is received, and the request includes the metadata of the digital content item. The received meta data is then used in step S120 to obtain the intrinsic attribute of the digital content item. In the step S140, the transaction right generated in the step S130 is sent.

Figure 2:
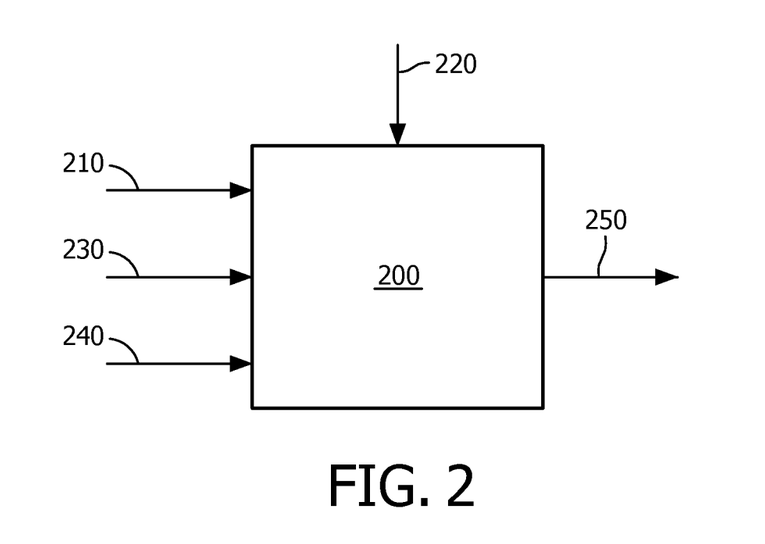
FIG. 2 depicts a schematic diagram of managing a transaction right in accordance with an embodiment of the present invention.

FIG. 2 depicts a schematic diagram of managing a transaction right in accordance with an embodiment of the present invention. Managing transaction right includes creating and/or updating transaction right.

As shown in FIG. 1, the method for managing the transaction right comprises a step S130 of generating the transaction right on the basis of the pre-stored rule and the attribute of the digital content item. Referring to FIG. 2, managing 200 transaction right of the utilization right of the digital content item can be further on the basis of transaction information 230 and/or previous transaction right 240 in addition to the intrinsic attribute 210 and the pre-stored rule 220.

The transaction information 230 refers to transaction information of at least one transaction of the utilization right of the digital content item.

The transaction information 230 can include the transaction information of the most recent transaction only. Alternatively, the transaction information 230 can include the transaction information of all transactions, including the first-hand transaction as well as any existing second-hand transactions.

The transaction information 230 can include statistical information such as the total amount of transaction times. Additionally or alternatively, the transaction information 230 can include transaction information for each of the at least one of the transactions. The transaction information of each transaction can include date of the transaction and/or price of the transaction. The transaction information of a transaction can include information about the seller and/or the purchaser such as geographic area where the seller and/or the seller is located and/or customer class of the seller and/or the purchaser. For example, the customer class may indicate whether the customer is a VIP customer not.

In an embodiment, when updating a transaction right, the previous transaction right 240 can be used with/without the pre-stored rule to generate the new transaction right 250. For example, this is beneficial in the case in which the pre-stored rule is changed after the generation of the previous transaction right 240, and at least some of the previous transaction right 240 shall not be impacted by the new pre-stored rule.

According to an embodiment of the present invention, the transaction information 230 as well as the transaction right 240/250 is recorded in the license for the utilization right. Since the license for the utilization right can only be modified by the digital management server, the transaction information can be prevented from any malicious modification.

The transaction right is to be managed in many different scenarios, some of which are illustratively described below.

In a first scenario, during a first-hand transaction of a utilization right of a digital content item occurs, a transaction right is created for the utilization right of the digital content item.

In a second scenario, during a second-hand transaction of a utilization right of a digital content item occurs, a transaction right is created if no transaction right is defined for the utilization right, or the transaction right of the utilization right is updated according to the second-hand transaction. For example, if the transaction right comprises a value for the number of allowed transaction times, the transaction right can be updated by decreasing the value by 1.

In a third scenario, no transaction right has been created for the utilization of a digital content item during any previous transaction of the digital content item, but a transaction right is created upon the request of the owner of the utilization right of a digital content item. For example, this can be applied for those digital content items sold out before the transaction right has ever been introduced to digital rights management.

In a fourth scenario, in response to a change in the pre-stored rule, all transaction right based on the pre-stored rule can be updated.

In a fifth scenario, in response to a change in the intrinsic attribute of a digital content item, the transaction right of each utilization right of the digital content item can be updated.

Figure 3:
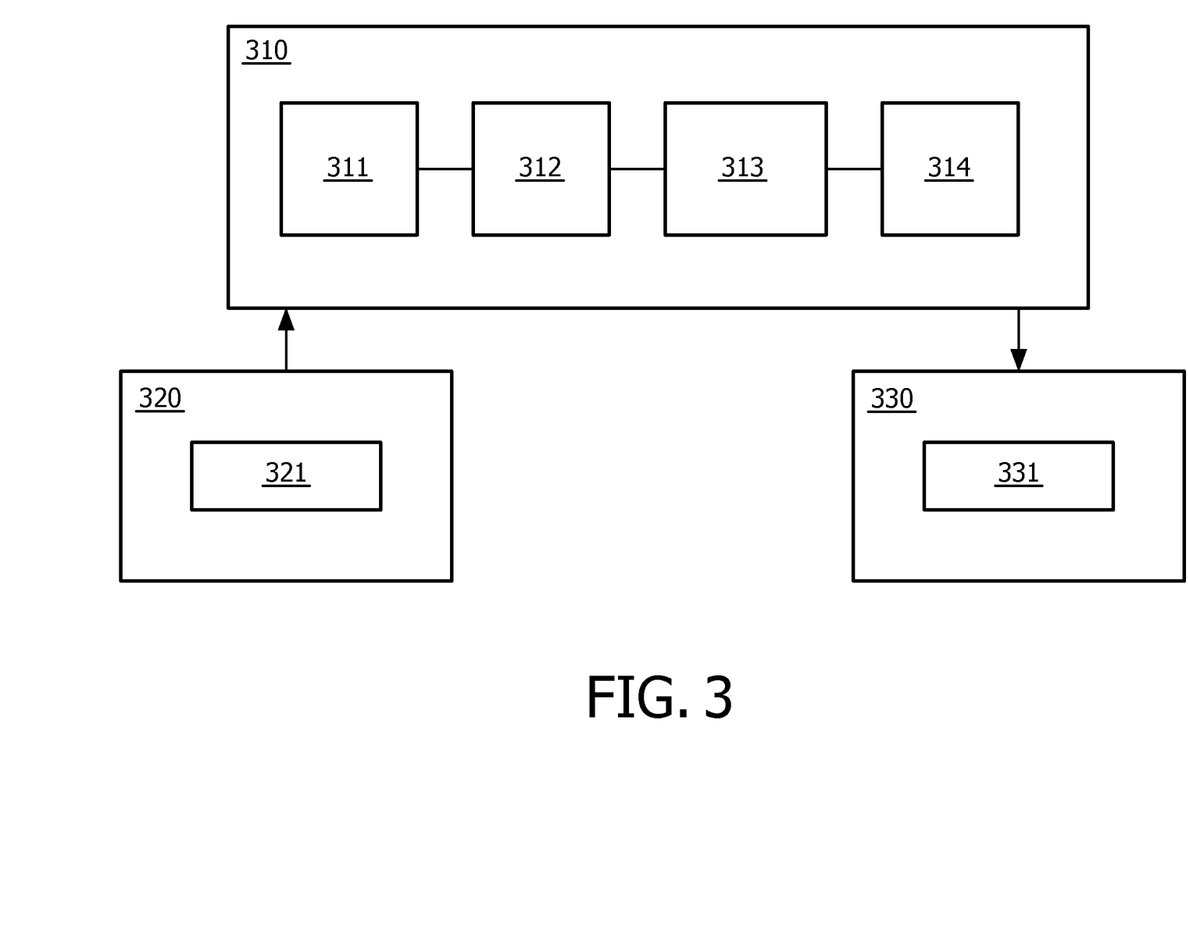
FIG. 3 depicts a schematic diagram of a first apparatus for managing a transaction right, a second and third apparatuses for supporting a transaction as well as the interconnection among them in accordance with an embodiment of the present invention.

FIG. 3 depicts a schematic diagram of a first apparatus for managing a transaction right, a second and third apparatuses for supporting a transaction as well as the interconnection among them in accordance with an embodiment of the present invention.

Referring FIG. 3, the first apparatus 310 for managing a transaction right comprises an obtaining unit 312 for obtaining an attribute associated with the digital content item from metadata of the digital content item and a generating unit 313 for generating the transaction right on the basis of a pre-stored rule and the attribute of the digital content item. Additionally, the first apparatus 310 can further comprise a receiving unit 311 and a sending unit 314. The receiving unit 311 receives a request for the transaction right, which includes the metadata of the digital content item. The metadata of the digital content item is then forwarded to the obtaining unit 312 to obtain the attribute associated with the digital content item. The sending unit 314 receives the generated transaction right from the generating unit 313 and then sends the transaction right.

Further referring FIG. 3, a second apparatus 320 for supporting a transaction comprises a sending unit 321 for sending a request for the transaction right, which includes the metadata of the digital content item. A third apparatus 330 for supporting a transaction comprises a receiving unit 331 for receiving a transaction right.

In an embodiment, the first apparatus 310 can reside within a digital management server. Alternatively, the first apparatus 310 can be separate from the digital management server but is communicatively coupled to the digital management server.

In an embodiment, the second apparatus 320 can reside in a transaction platform. The transaction platform can be operated by the publisher, the retailer or a third party. Typically, the platform should be authorized by the publisher and/or the retailer or else could be authorized by a same higher level organization, if the platform is operated by a third party. For example, when a deal is made for a transaction of a utilization right of a digital content item between two customers (i.e. a seller and a purchaser) on the transaction platform, the platform can send a request for transaction right to the first apparatus 310. Additionally or alternatively, the second apparatus 320 can reside in a digital right management client of a customer. For example, when a customer sells a utilization right of a digital content item to another customer, he can directly sends a request for transaction right to the first apparatus 310.

In an embodiment, the third apparatus 330 can reside in the transaction platform. For example, when the transaction platform receives a transaction right of a utilization right of a digital content item from the first apparatus, it then forwards the received transaction right to the owner of the utilization right, namely the purchaser in the dealt transaction. Additionally or alternatively, the third apparatus 330 can reside in a digital right management client of a customer. For example, when a customer purchases a utilization right of a digital content item from another customer, he can directly receives the transaction right of the utilization right from the first apparatus 310.

Figure 4:
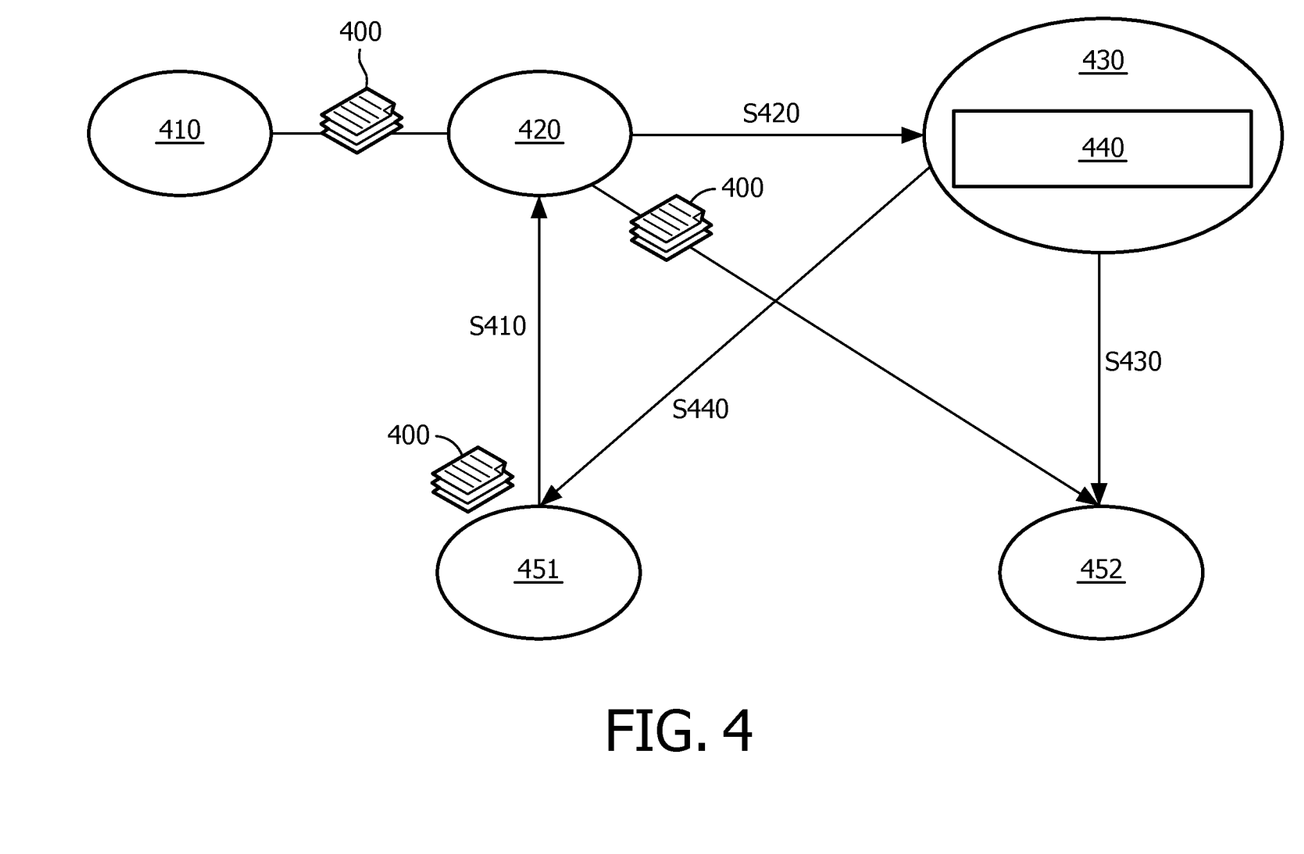
FIG. 4 depicts a schematic diagram of an exemplary application scenario in accordance with an embodiment of the invention.

FIG. 4 depicts a schematic diagram of an exemplary application scenario in accordance with an embodiment of the invention.

In this embodiment, a license for a utilization right of an e-book comprises transaction right. Optionally, the license may further comprise a history record which contains transaction information of the past transactions of the utilization right.

In this embodiment, the metadata of an e-book includes an intrinsic attribute field carrying the attribute associated with the e-book. The attribute indicates the category of the e-book. For illustrative purpose, an example for the metadata of the e-book 400 is shown as follows:

Metadata:
{e-book ID: 12345678;
Title: XXXXX;
Publisher ID: 87654321
Attribute: popular novel}

In this embodiment, a plurality of categories are defined according to e-book type, including newspaper, news periodicals, healthcare periodicals, popular science periodicals, popular novels, classic novels, academic paper, market report, textbook for primary and secondary schools, textbook for university. A number of rules are pre-stored in a rule database. Each rule corresponds to a different publisher. Each rule contains a plurality of transaction rights, each of which corresponds to one of the plurality of categories. For illustrative purpose, an example a pre-stored rule corresponding to a publisher with ID 87654321 is shown as follows. (Please note that only the transaction right for the category of popular novels are shown whilst the others are omitted for conciseness.)

```
Pre-stored rule:
{Publisher ID: 87654321
Category 0: News paper
Category 1: News periodicals
Category 2: Healthcare periodicals
Category 3: Popular science periodicals
Category 4: Popular novels
    {Transaction rule:
        The amount of transaction times
            {Restriction 1: <2 times in the first year
    }
        Geographic restriction: China;
    Price range of transaction;
        {Restriction 1: >75% in the first year
    }
    Pages range for preview
        {Restriction 1: preface;
    Restriction 2: <20 pages}
    }
Category 5: Classic novels
Category 6: academic paper
Category 7: Market report
Category 8: Textbook for primary and secondary schools
Category 9: Textbook for university
Category ...}
```

In this embodiment, when the customer 451 purchases the utilization right of the e-book 400 from the publisher or the retailer, the transaction right of the utilization right is also generated and included in the license for the utilization right, and then the license is granted to the customer 451. According to the exemplary metadata of the e-book 400 and the exemplary pre-stored rule shown in the above, the transaction right is generated as follows:

```
Transaction rights:
{
The amount of transaction times
        {Restriction 1: <2 times in the first year}
Geographic restriction: China;
Price range of transaction;
{Restriction 1: >75% in the first year}
}
```

With reference to FIG. 4, the procedure for a transaction of a utilization right of an e-book 400 from a customer 451 to a customer 452 via a transaction platform 420 in accordance with an embodiment of the invention will be described below.

In step S410, the customer 451 who tries to resell the utilization right of e-book 400 to the customer 452 firstly sends a transaction request to the transaction platform 420, for example via the digital rights management (DRM) client. The transaction request includes the e-book ID of the e-book 400, the license for the utilization right of the e-book 400 which contains the transaction right, and the transaction information of the requested transaction including the user ID of the customer 451, the user ID of the customer 452 who the customer 451 tries to resell the e-book to, the price, the date when the customer 451 purchased the e-book 400.

Alternative to the license for the utilization right of the e-book 400, the transaction request can include the license ID of the license. As well-known, the DMR server 430 typically has a license database from which a license can be retrieved using the corresponding license ID.

After receiving the transaction request from the customer 451, the transaction platform 420 check whether the requested transaction is permitted according to the transaction right and the transaction information of the requested transaction included in the transaction request. If the requested transaction is not permitted, the procedure is terminated. In this embodiment, assume that the date when the customer 451 purchases the e-book 400 is Jun. 19, 2012, the current date is Jul. 19, 2012, the customer 452 is located in China, and the price is 85% of the original price, and accordingly the transaction platform 420 determines that the requested transaction is permitted. Alternative to the transaction platform 420, the DRM server 430 may check whether the requested transaction is permitted or not and inform the transaction platform 420 of the checking results.

Once determining that the requested transaction is permitted, the transaction platform 420 triggers the license acquisition process by sending a trigger to the DRM server 430, wherein the license is to be granted to the purchaser of the permitted transaction, namely the customer 452. The trigger comprises the metadata of the e-book 400 including the intrinsic attribute and the transaction information of the permitted transaction. The transaction platform 420 can obtain the metadata of the e-book 400 from the corresponding publisher 410 or from the customer 451. Optionally, the trigger comprises all information in the transaction request.

When receiving the trigger from the transaction platform 420, the DRM server 430 generates an updated transaction rights for the purchaser of the permitted transaction, namely the customer 452 as follows:

```
Transaction right;
{
The amount of transaction times
        {Restriction 1: <1 times in future 11 months}
Geographic restriction: China;
Price range of transaction;
{Restriction 1: >75% in future 11 month}
}
```

Next, the DRM server 430 generates a license for the utilization right of the e-book 400 which includes the updated transaction right.

In step S430, the DRM server 430 grants the generated license with the updated transaction right to the customer 452.

As shown in FIG. 4, the customer 452 downloads the e-book 400 from the transaction platform. Alternatively, the customer 452 may receive the e-book 400 directly from the customer 451. Upon obtaining both the e-book 400 and the license for the utilization right of the e-book 400, the customer 452 can read the e-book.

In step S440, the DRM server 430 instructs the DRM client of the customer 451 to destroy the license of the utilization right of the e-book 400 such that the customer 451 no long has the right to use the e-book 400. In case that license for the utilization right of the e-book 400 contains license for utilization right of other e-books, the DRM server 430 may modify the license such that it no longer contains the license for the utilization right of the e-book 400 and then send the modified license to customer 451.

A set of computer-executable instructions is further proposed to perform the methods described above. The instructions can resides in the sending unit, the obtaining unit, the generating unit and/or the receiving unit of the first apparatus, in the sending unit of the second apparatus and/or in the receiving unit of the third apparatus to perform any step of the above disclosed methods.

Although the present invention will be described with reference to the embodiment shown in the drawings, it should be understood that the present invention may be embodied in many alternate forms including any combination of hardware and software. In addition, any suitable size, shape or type of materials, elements, computer program elements, computer program code, or computer program modules could be used.

While discussed in the context of computer program code, it should be understood that the modules may be implemented in hardware circuitry, computer program code, or any combination of hardware circuitry and computer program code.

It should be noted that the above-mentioned embodiments illustrated rather than limit the invention and that those skilled in the art would be able to design alternative embodiments without departing from the scope of the appended claims. The embodiments are illustrative rather than restrictive. It is intended that the invention include all modifications and variations to the illustrated and described embodiments within the scope and spirit of the invention. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. In the device claims enumerating several units, several of these units can be embodied by one and the same item of hardware or software. The usage of the words first, second and third, et cetera, does not indicate any ordering. These words are to be interpreted as names.

The invention claimed is:

1. A method for managing a transaction right in a digital rights management server, the transaction right being the right to a transaction of a utilization right of a digital content item, the method comprising steps of:
    in response to receiving a request for the transaction right, obtaining an intrinsic attribute that is derived from metadata of the digital content item and is the same for any utilization right of the digital content item; and
    selectively generating the transaction right on the basis of a pre-stored rule, transaction information of the utilization right of the digital content item and the intrinsic attribute of the digital content item; wherein the intrinsic attribute comprises a plurality of type, publishing price, and ranking of the digital content item; and wherein the pre-stored rule is set by at least one of the publisher and retailer.

2. The method according to claim 1, wherein the intrinsic attribute is associated with at least one of type, category, author, and publisher.

3. The method according to claim 1, further comprising: updating the intrinsic attribute on the basis of transactions and/or utilizations of the digital content item.

4. The method according to claim 1, wherein the transaction right comprises one or more right entries, and each right entry indicates one of the following restrictions for the transaction of the utility right of the digital content item: restriction on transaction times, restriction on transaction frequency, restriction on transaction time, restriction on a geographic area of the transaction, and restriction on price of the transaction.

5. The method according to claim 1, wherein,
the method further comprises a step of obtaining transaction information of at least one prior transaction of the utilization right of the digital content item; and
the step of generating further comprises generating the transaction right on the basis of transaction information of the at least one prior transaction.

6. The method according to claim 5, wherein the transaction information of the at least one transaction is recorded in a license for the utilization right.

7. The method according to claim 1, further comprising:
obtaining the transaction right;
obtaining transaction information of at least one prior transaction of the utilization right of the digital content item; and
updating the transaction right on the basis of the transaction information of the at least one prior transaction and at least one of the intrinsic attribute, the obtained transaction right, and the pre-stored rule.

8. The method according to claim 1, wherein the transaction right of the utilization right is recorded in a license for the utilization right.

9. The method according to claim 1, further comprising steps of:
receiving the request for the transaction right, wherein the request includes the metadata of the digital content item; and
sending the transaction right after the step of generating the transaction right.

10. A computer readable medium, that is not a transitory propagating wave or signal, comprising computer-executable instructions for managing a transaction right, the transaction right being the right to a transaction of a utilization right of a digital content item, wherein the computer-executable instructions are configured to perform the method according to claim 1 when being executed.

11. A method for supporting a transaction of a utilization right of a digital content item, a transaction right being the right to a transaction of the utilization right of the digital content item, the method comprising steps of:
sending a request for the transaction right to a digital rights management server, the request including metadata of the digital content item, the metadata of the digital content item comprising an intrinsic attribute that is the same for any utilization right of the digital content item; and
selectively generating the transaction right by the digital rights management server on the basis of a pre-stored rule, transaction information of the utilization right of the digital content item and the intrinsic attribute of the digital content item, wherein the intrinsic attribute comprises a plurality of type, publishing price, and ranking of the digital content item, and wherein the pre-stored rule is set by at least one of the publisher and retailer.

12. A computer readable medium, that is not a transitory propagating wave or signal, comprising computer-executable instructions for supporting a transaction of a utilization right of a digital content item, a transaction right being a right to a transaction of the utilization right of the digital content item, wherein the computer-executable instructions are configured to perform the method according to claim 11 when being executed.

13. A method for supporting a transaction of a utilization right of a digital content item, a transaction right being the right to a transaction of the utilization right of the digital content item, the method comprising a step of:
receiving the transaction right from a digital rights management server, the transaction right being selectively generated in response to receiving a request for the transaction right by the digital rights management server on the basis of a pre-stored rule, transaction information of the utilization right of the digital content item and an intrinsic attribute of the digital content item in metadata of the digital content item, wherein the intrinsic attribute is the same for any utilization right of the digital content item and comprises a plurality of type, publishing price, and ranking of the digital content item, and wherein the pre-stored rule is set by at least one of the publisher and retailer.

14. A computer readable medium, that is not a transitory propagating wave or signal, comprising computer-executable instructions for supporting a transaction of a utilization right of a digital content item, a transaction right being a right to a transaction of the utilization right of the digital content item, wherein the computer-executable instructions are configured to perform the method according to claim 13 when being executed.

15. An apparatus that is not a transitory propagating wave or signal in a digital rights management server for managing a transaction right, the transaction right being the right to a transaction of a utilization right of a digital content item, the apparatus comprising:
a device configured to obtain an intrinsic attribute that is derived from metadata of the digital content item and is the same for any utilization right of the digital content item;
and configured to selectively generate, in response to receiving a request for the transaction right, the transaction right on the basis of a pre-stored rule, transaction information of the utilization right of the digital content item and the intrinsic attribute of the digital content item, wherein the intrinsic attribute comprises a plurality of type, publishing price, and ranking of the digital content item, and wherein the pre-stored rule is set by at least one of the publisher and retailer.

16. An apparatus that is not a transitory propagating wave or signal for supporting a transaction of a utilization right of a digital content item, a transaction right being the right to a transaction of the utilization right of the digital content item, the apparatus comprising:
a device configured to send a request for the transaction right to a digital rights management server, the request including metadata of the digital content item, the metadata of the digital content item comprising an intrinsic attribute that is the same for any utilization right of the digital content item;
wherein the transaction right is selectively generated in response to receiving a request for the transaction right by a digital rights management server on the basis of a pre-stored rule, transaction information of the utilization right of the digital content item and the intrinsic attribute of the digital content item, wherein the intrinsic attribute comprises a plurality of type, publishing price, and ranking of the digital content item, and wherein the pre-stored rule is set by at least one of the publisher and retailer.

17. An apparatus that is not a transitory propagating wave or signal for supporting a transaction of a utilization right of a digital content item, a transaction right being the right to a transaction of the utilization right of the digital content item, the apparatus comprising:
  a device configured to receive the transaction right, the transaction right being selectively generated in response to receiving a request for the transaction right by a digital rights management server on the basis of a pre-stored rule, transaction information of the utilization right of the digital content item and an intrinsic attribute that is derived from metadata of the digital content item and is the same for any utilization right of the digital content item, wherein the intrinsic attribute comprises a plurality of type, publishing price, and ranking of the digital content item, and wherein the pre-stored rule is set by at least one of the publisher and retailer.

* * * * *